Sept. 3, 1968  R. M. DROUGARD ET AL  3,399,591
INTERFEROMETER FOR PRODUCING VARIABLE SPATIAL FREQUENCY FRINGES
Filed Aug. 13, 1964  2 Sheets-Sheet 1

INVENTORS
RENEE M. DROUGARD
JANUSZ S. WILCZYNSKI
BY Edward G. Fiorito
ATTORNEY

United States Patent Office 3,399,591
Patented Sept. 3, 1968

3,399,591
INTERFEROMETER FOR PRODUCING VARIABLE SPATIAL FREQUENCY FRINGES
Renee M. Drougard, Yorktown Heights, and Janusz S. Wilczynski, Ossining, N.Y., assignors to International Business Machines Corporation, New York, N.Y., a corporation of New York
Filed Aug. 13, 1964, Ser. No. 389,376
5 Claims. (Cl. 88—14)

ABSTRACT OF THE DISCLOSURE

An interferometer for producing variable spatial frequency fringes wherein there are utilized two Wollaston prisms, each of the latter prisms being disposed on an opposite side of a half-wave plate. A light polarizer is disposed between a source of light to be analyzed and one of the prisms and a light analyzer is disposed between the other prism and an interferometer display area. One prism may be rotated relative to the other. The light beam to be analyzed is passed through the input polarizer and then through the Wollaston prisms whereby a deflection of the light beam takes place. Upon passing the latter beam through the output analyzer, a fringe pattern is produced whose spatial frequency is adjustable in response to rotational motion of the Wollaston prisms.

---

This invention relates to devices for altering the polarization of a beam of light, and more particularly to compensators and interferometers which produce a field of light wherein the state of polarization varies across the field.

Compensators, such as the Babinet compensator, and prisms, such as the Wollaston and Rochon prisms, are well known devices which alter the polarization of light. When a broad beam of polarized light is passed through these devices, a field of light is produced having a nonuniform state of polarization. The nonuniform field may be observed by passing the light through a polarizer, such as a Nicol prism to produce a grating of dark bands, or fringes.

The distance between the fringes is determined by the angular construction of the above devices. These devices are composed of two wedges constructed so that each wedge has the same angle at the tapered end. Normally, in order to adjust the distance between fringes, the angle of the wedges must be changed. This requires that a different set of prisms or compensators be available for each adjustment of the distance between fringes.

It is an object of the present invention to provide an improved device for variably altering the polarization of light passing therethrough.

Another object of the present invention is to provide a compensator for producing a field of polarization capable of adjustment.

Still another object of the present invention is to provide an interferometer capable of producing a field of fringes wherein the distance between the fringes can be varied.

It is a further object of the present invention to provide adjustable compensators and interferometers having high stability and insensitivity to vibration.

Another object of the present invention is to provide compensators and interferometers capable of easy adjustment.

These and other objects of the present invention are accomplished by providing a pair of Wollaston prisms, a polarizer, an analyzer, and a half-wave plate all of which are aligned perpendicularly to a common axis. The two optical axes of the Wollaston prisms are oriented at 45° with respect to the polarizer. The polarizer is arranged to be the first element through which a beam of light passes parallel to the common axis. A half-wave plate is located between the Wollaston prisms with its axes oriented 45° with respect to the polarizer. The analyzer, crossed at 90° with respect to the polarizer, is located so that the beam of light passes through the other elements prior to arriving at the analyzer. When observing the beam of light emerging from the analyzer, a grating of fringes is seen. The distance between the fringes may be varied by simultaneously rotating the polarizer and adjacent Wollaston prism in one direction about the common axis and rotating the analyzer and adjacent Wollaston prism in the other direction. The half-wave plate remains stationary. It is to be noted in connection with the above that Wollaston prisms have the inherent characteristic of providing a symmetrical phase difference of the beams emerging therefrom with respect to the light entering thereinto.

With this arrangement the same pair of Wollaston prisms can be used to produce a grating of fringes having an adjustable distance between the fringes, thereby making it unnecessary to have different prisms for each fringe separation desired.

Other advantages of the present invention are the stability and relative insensitivity to vibration, and the easy adjustment of the fringe separation.

In accordance with another aspect of the present invention, a half-wave plate and Soleil compensator are added to the above elements. The two added components are located between the polarizer and adjacent Wollaston prism. The two optical axes of the Soleil compensator are oriented 45° with respect to the polarizer, and the axes of the added half-wave plate are oriented at 45° with respect to the polarizer.

In this modification of the present invention, the polarizer and Soleil compensator remain stationary while the added half-wave plate is caused to rotate at half the speed of the adjacent Wollaston prism. As in the first described device, a grating of fringes is observed and the distance between fringes may be altered as a function of the opposite rotation of the Wollaston prisms. However, an additional alteration of the grating may be accomplished by adjustment of the Soleil compensator which produces a translation of the grating while maintaining the distance between fringes constant.

The foregoing and other objects, features and advantages of the invention will be apparent from the following more particular description of preferred embodiments of the invention, as illustrated in the accompanying drawings.

Figure 1:
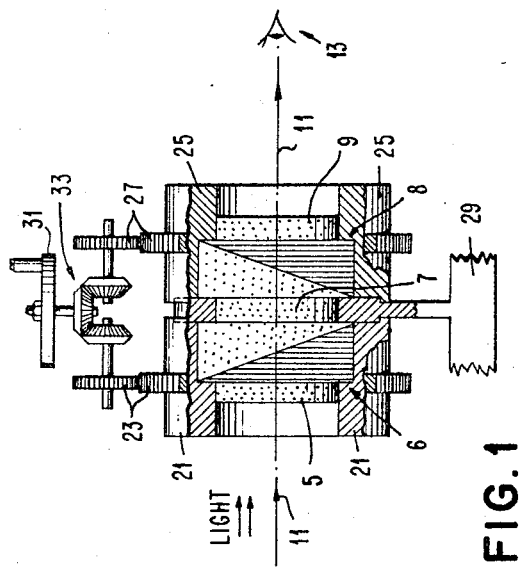
FIG. 1 is a diagram illustrating an interferometer embodying the present invention.
Figure 2:
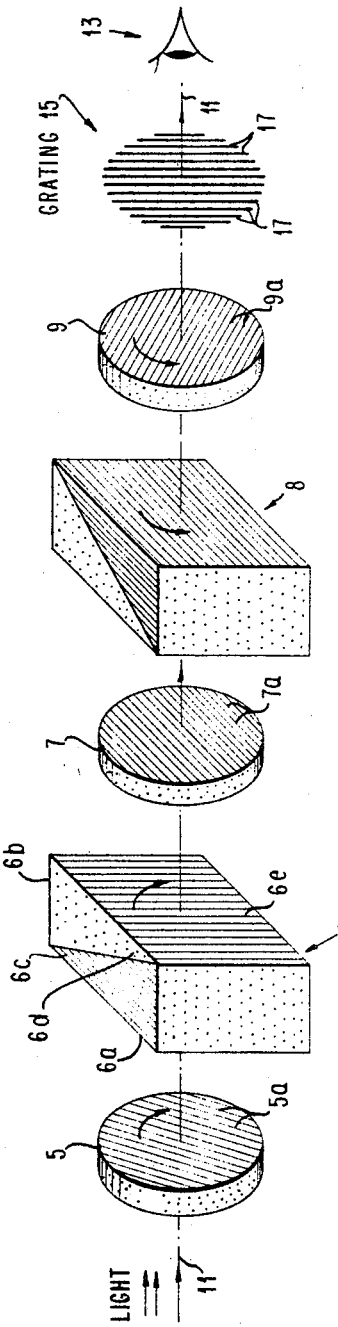
FIG. 2 is an expanded diagram of the optical components shown in FIG. 1.

The interferometer shown in FIG. 1 includes five optical elements 5–9, shown in expanded view in FIG. 2. Each of the optical elements 5–9 is arranged perpendicular to a common axis 11. Light is passed from left to right parallel to the axis 11.

An observer at the location 13 sees a grating 15 including a plurality of vertical fringes 17. The distance between the fringes 17 can be altered by rotating elements 5 and 6 in one direction about axis 11 and elements 8 and 9 in the other direction about axis 11. The mechanism for providing this rotation is illustrated in FIG. 1.

Elements 5 and 6 are mounted in a circular holder 21 having a set of teeth 23 about the periphery. A similar holder 25 and teeth 27 have elements 8 and 9 mounted therein. Element 7 is fixedly mounted by a member 29 illustrated generally in FIG. 1.

The holders 21 and 25 are rotated in opposite directions in response to the rotation of knob 31 and an associated gear train 33.

The manner in which the grating 15 is developed may be described by examining the state of polarization of the light passing through the elements 5–9. Element 5 is a polarizer having a direction of polarization oriented as shown by an array of parallel lines 5a. Element 6 is a Wollaston prism formed by two birefringent wedges 6a and 6b. Angles 6c and 6d at the tapered ends of wedges 6a and 6b respectively are constructed to be equal so that the Wollaston prism 6 includes two major parallel surfaces, one of which is designated 6e and shown in FIG. 2. The optic axis of wedge 6a is horizontal, while the optic axis of wedge 6b is vertical. The parallel lines illustrate the direction of the optic axes, while the dotted surfaces represent the ends of the parallel lines.

Element 8 is a Wollaston prism identical to prism 6. The two optic axes of Wollaston prism 8 are oriented as shown in FIG. 2 by the parallel lines and the dotted surfaces. Element 7 is a half-wave plate having a slow axis illustrated by the horizontal lines 7a and a fast vertical axis (not shown). Element 9 is an analyzer which passes light polarized in the direction of parallel line 9a. The analyzer 9 is oriented at 90°, or crossed, with respect to the polarizer 5.

The polarizer 5 and Wollaston prism 6 operate in a conventional manner. Polarizer 5 produces plane polarized light polarized in the direction of the optic axis 5a. The plane polarized light emerging from polarizer 5 can be regarded as consisting of two mutually perpendicular components, one horizontal and one vertical of equal magnitude and phase. The Wollaston prism 6 introduces a phase difference between the two components by retarding one component with respect to the other component.

The phase difference varies in a horizontal direction across the Wollaston prism due to the variation in thickness of the wedges 6a and 6b. The variation in phase delay may be visually observed by looking at the light emerging from the Wollaston prism 6 through an analyzer. The Wollaston prism 6 produces a vertical grating of fringes such as fringes 17. The distance between the fringes is determined by the angles 6c and 6d and cannot be changed without substituting another Wollaston prism having different angles for Wollaston prism 6. The fringes appear at a spatial frequency given by the equation $$f_0 = [2(n_e - n_o) \tan (6c)]/\lambda$$

(Equation 1)

where $f_0$ is the spatial frequency, $\lambda$ is the wavelength of the light, and $n_e$ and $n_o$ are the two principal indexes of the Wollaston prism material.

The variably polarized light emerging from Wollaston prism 6 is passed through half-wave plate 7 where the horizontal component undergoes a half-wave retardation. The function of the half-wave plate 7 becomes important when the prisms 6 and 8 are rotated. Accordingly a more detailed description of the function of plate 7 is presented with reference to FIG. 3.

As the two mutually perpendicular polarization components of the light emerging from half-wave plate 7 pass through Wollaston prism 8, the components undergo further phase retardation introducing a greater phase difference. The phase difference is effectively doubled by Wollaston prism 8 thereby producing twice as many more closely spaced vertical fringes 17 which may be observed by looking through analyzer 9.

As described above, the distance between the fringes 17 can be varied. An example is described below where polarizer 5 and Wollaston 6 are rotated an angle $\phi$ in the clockwise direction while Wollaston prism 8 and analyzer 9 are rotated an angle $\phi$ in the counterclockwise direction, half-wave plate 7 remaining stationary.

Figure 3:
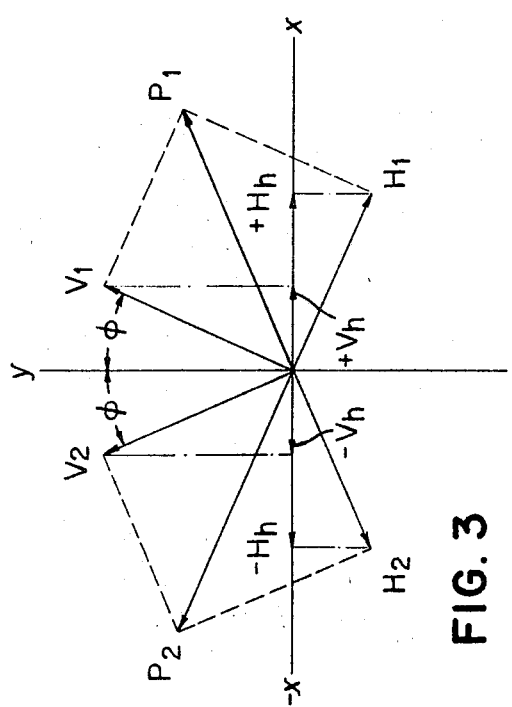
FIG. 3 is a vectorial diagram illustrating the manner in which the polarization of light is altered as it passes through the optical components shown in FIG. 2.

In order to aid in describing the manner in which the polarization of the light is altered as it passes through the components 5–9, a vectorial diagram is shown in FIG. 3. The vector $P_1$ illustrates the plane of polarization of the light emerging from polarizer 5 which is rotated in a clockwise direction through an angle $\phi$. The plane polarized light emerging from polarizer 5 can be considered to have a vertical component of polarization $V_1$ offset from the vertical by an angle $\phi$ and a horizontal component of polarization $H_1$ angularly displaced an equal amount from the horizontal.

After the polarization components $V_1$ and $H_1$ pass through the prism 6, a phase difference is introduced which cannot be illustrated in the two-dimensional plane of FIG. 3. As described above the phase difference varies horizontally across the Wollaston prism 6.

The polarization components $V_1$ and $H_1$ can be considered to include horizontal components $+V_h$ and $+H_h$, respectively. As the polarization components $V_1$ and $H_1$ pass through half-wave plate 7, their respective horizontal components $+V_h$ and $+H_h$ are retarded an amount of time equal to one half of a wavelength, thereby reversing the vectorial direction of the horizontal components $+V_h$ and $+H_h$ into the position of a pair of horizontal vectors $-V_h$ and $-H_h$ respectively. Therefore, the polarization component $V_1$ is effectively rotated into the vectorial position $V_2$ and the polarization component $H_1$ is rotated to the new position $H_2$ shown in FIG. 3. The two polarization components $V_2$ and $H_2$ are at 45° with respect to the vector $P_2$, which is displaced from the 45° position by an angle $\phi$. The orientation of vector $P_2$ corresponds to the direction of polarization of light permitted to pass through analyzer 9, and $P_2$ is at 45° with respect to the optic axes of Wollaston prism 8. Due to this correspondence, Wollaston prism 8 adds to the phase difference introduced by Wollaston prism 6. However, the phase difference is not doubled as in the initial setting shown in FIG. 2. Therefore, when the Wollaston prisms 6 and 8 have a relative angular displacement, the fringes 17 do not appear as close together as shown in FIG. 2. The spatial frequency is given by the formula $$f_\phi = [4(n_e - n_o) \tan (6c) \cos \phi]/\lambda$$

(Equation 2)

where $f_\phi$ is the spatial frequency of fringes when the prisms 6 and 8 are rotated through an angle $\phi$ and (6c), and $n_e$, $n_o$ are as defined with reference to the Equation 1.

When the angle $\phi$ in FIG. 3 becomes larger than 60°, the Wollaston prism 8 begins compensating for the phase difference introduced by Wollaston prism 6. Therefore, the resultant phase difference after the light passes through both Wollaston prisms 6 and 8 is less than the phase difference introduced by Wollaston 6 alone. Accordingly, the fringes 17 are more widely separated.

When the angle $\phi$ shown in FIG. 3 reaches 90°, complete compensation is achieved causing the fringes 17 to disappear. Therefore, the device is capable of producing fringes at a spatial frequency equal to twice that of a single Wollaston prism, and the spatial frequency can be varied down to any amount approaching zero.

Figure 4:
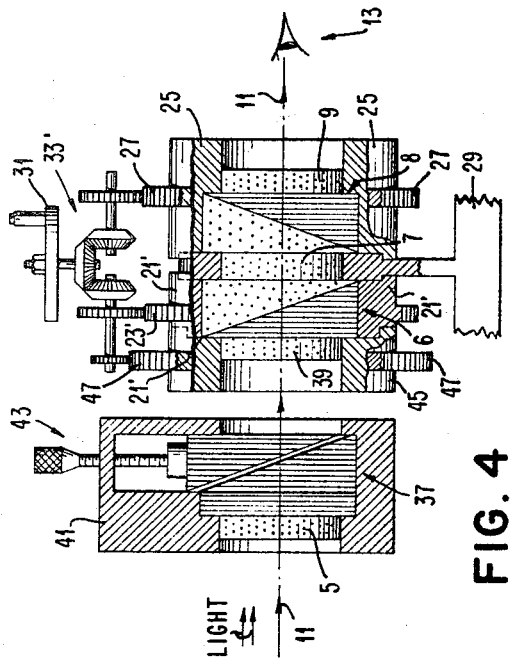
FIG. 4 is a diagram of another interferometer embodying the present invention.
Figure 5:
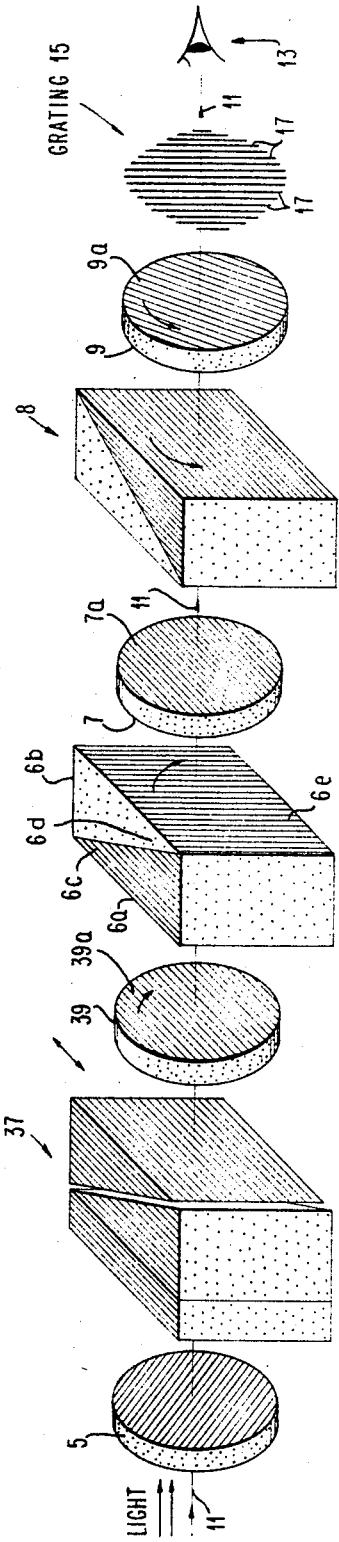
FIG. 5 is an expanded diagram of the optical components shown in FIG. 4.

FIGS. 4 and 5 illustrate another embodiment of the present invention which provides for translation of the fringes 17 while maintaining their separation constant. Elements in FIGS. 4 and 5 are assigned the same numerical designations as corresponding elements in FIGS. 1 and 2. Two additional optical components are added, viz a Soleil compensator 37 and half-wave plate 39, the latter having an optic axis 39a in the horizontal direction. The Soleil compensator operates in a conventional manner to introduce a uniform phase delay between mutually perpendicular components of polarization of light emerging from polarizer 5.

The polarizer 5 and Soleil compensator 37 are stationarily mounted in a holder 41 shown in FIG. 4. The Soleil compensator is provided with a threaded screw arrangement 43 for adjusting the amount of phase difference to be introduced.

Elements 7–9 are mounted in the structure of FIG. 4 in the same manner as shown and described with reference to FIG. 1. Wollaston prism 6 is mounted in a holder 21′ which engages the gear train 33 by means of teeth 23′. The holder 21′ is modified to include only the Wollaston prism 6 as opposed to the form of holder 21 shown in FIG. 1 where polarizer 5 is simultaneously rotated with Wollaston prism 6. In the embodiment shown in FIG. 4, half-wave plate 39 is mounted in a holder 45 provided with peripheral teeth 47 which engage a gear train 33′ designed to rotate the half-wave plate 39 at one-half of the angular rotation of Wollaston prism 6.

Figure 6:
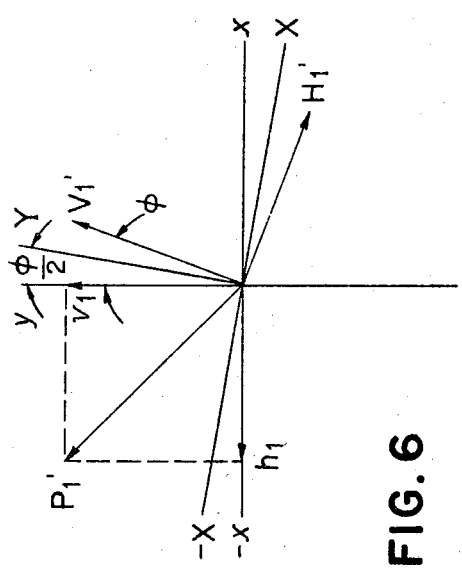
FIG. 6 is a vectorial diagram of the polarization of light passing through a few of the optical components shown in FIG. 5.

The vectorial diagram shown in FIG. 6 illustrates the manner in which the half-wave plate 39 aligns the polarization components to correspond to the optic axes of Wollaston prism 6 when the Wollaston prisms 6 and 8 are rotated at angle $\phi$. The light emerging from polarizer 5 is polarized at an angle 45° with respect to coordinates $y$ and $x$ as represented by the vector $P_1'$. The two mutually perpendicular components of polarization $V_1$ and $H_1$ are in phase when the light emerges from polarizer 5. After passing through Soleil compensator 37, the two components $V_1$ and $H_1$ are out of phase, a situation not capable of illustration in the two-dimensional FIG. 6.

While the coordinates $y$ and $x$ for polarizer 5 are vertical and horizontal respectively, rotation of the half-wave plate 39 causes a shift in the coordinates to the position represented by axes X and Y. Due to the gear train 33′ shown in FIG. 4, the shift is equal to an angle $\phi/2$. The components of vectors $v_1'$ and $h_1'$ along the coordinate axes X and Y are reversed by the half-wave plate 39 producing new mutually perpendicular components of polarization $V_1'$ and $H_1'$.

The components $V_1'$ and $H_1'$ are aligned with the optic axes of Wollaston prism 6 which is rotated an angle $\phi$. The Wollaston prism 6 and remaining elements 7–9 operate in the same manner as that described with reference to FIG. 3. The effect of the Soleil compensator 37 is to add an initial phase difference to the polarization components prior to their arrival at Wollaston prism 6. This initial phase difference causes the fringes 17 to appear at a different place, translated horizontally to the left or right dependent upon the amount and polarity of the phase difference. No change is made in the distance between the fringes 17 which depend upon the angular orientation of Wollaston prisms 6 and 8.

In summary, what has been described is an optical device for altering the polarization of a beam of light to produce a grating 15 of fringes 17. The separation between fringes may be varied, and the entire grating 15 may be translated. The device uses relatively few optical elements which may be mounted for easy adjustment. Further, it has been found that the device is relatively insensitive to vibrations since both the horizontal and vertical polarization components experience the same deviations due to external vibration.

While the embodiments of the present invention employ Wollaston prisms 6 and 8, Rochon prisms may be employed or any other device may be employed which introduces a spatially variant phase difference between orthogonal polarization components of the light passing therethrough.

Further, the polarizer 5 and analyzer 9 need not be crossed. If the orientation of analyzer 9 is changed 90° from the position shown in FIG. 2, the dark fringes 17 become light and the spaces therebetween become dark fringes, such as 17.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An interferometer apparatus for producing a spatially variable fringe grating of a beam of light traveling in a given path comprising:
   polarizing means in said path for plane polarizing said light in the direction of the optical axis of said last-named means;
   first and second like means serially aligned in said path for receiving the polarized light from said polarizing means and for producing a phase difference between the orthogonal polarization components of said polarized light;
   first compensator means having a slow axis and a fast vertical axis disposed intermediate said first and second means for retarding one of the orthogonal components of said polarized light emerging from said first means a chosen phase quantity;
   analyzing means in said path for receiving the light passing through said second means to produce a fringe grating of the light passed therethrough;
   means for rotating said first and second means in equal and opposite directions to correspondingly vary the spacing of the fringes in said grating;
   variable wave plate means for producing a spatially uniform phase difference between orthogonal polarization components of light passing therethrough serially disposed in said path to directly receive the light emerging from said polarizing means; and
   second compensator means disposed in said path intermediate said variable wave plate and said first means, said variable wave plate means including adjusting means for changing the amount of phase difference introduced.

2. An interferometer apparatus as defined in claim 1 wherein said rotating means comprises mounting means for rotating said first means in said one direction while simultaneously rotating said second means and said analyzing means in an equal and opposite direction about a common axis, for fixedly maintaining said first compensator means, for rotating said second compensator means at one-half the rate and in the same direction as said first means and for fixedly maintaining said polarizing means and said variable wave plate means whereby the distance between the fringes in the light emerging from said analyzing means is varied as a function of the amount of rotation of said rotating means and the location of said fringes is translated in accordance with the adjustment of the phase difference introduced by said variable wave-plate means.

3. An interferometer apparatus as defined in claim 2 wherein said variable wave-plate means is a Soleil compensator and said first and second means are Wollaston prisms.

4. An interferometer apparatus as defined in claim 3 wherein said first and second means each include two portions having orthogonal optical axes initially arranged at 45° with respect to the direction of polarization of said polarizing means.

5. An interferometer apparatus as defined in claim 4 wherein each of said compensator means comprise half-wave plates each of said last-named plates having a slow axis oriented at 45° with respect to the direction of said polarizing means.

References Cited

UNITED STATES PATENTS 3,182,551  5/1965  Piller _____ 350—12
942,393  12/1909  Konig _____ 88—14

FOREIGN PATENTS 866,091  7/1959  Great Britain.
1,002,616  12/1961  Great Britain.

JEWELL H. PEDERSEN, *Primary Examiner.*

B. J. LACOMIS, *Assistant Examiner.*